US 12,131,587 B2
Oct. 29, 2024

United States Patent
Ackerman

(10) Patent No.: US 12,131,587 B2
(45) Date of Patent: Oct. 29, 2024

(54) METHOD AND SYSTEM FOR DETECTION OF WEIGHTED CONTACT LENSES IMPRINTED WITH IRIS IMAGES

(71) Applicant: Princeton Identity, Hamilton, NJ (US)

(72) Inventor: David Alan Ackerman, Hopewell, NJ (US)

(73) Assignee: Princeton Identity, Hamilton, NJ (US)

( * ) Notice: Subject to any disclaimer, the term of this patent is extended or adjusted under 35 U.S.C. 154(b) by 339 days.

(21) Appl. No.: 17/513,220

(22) Filed: Oct. 28, 2021

(65) Prior Publication Data
US 2022/0138479 A1    May 5, 2022

Related U.S. Application Data

(60) Provisional application No. 63/106,931, filed on Oct. 29, 2020.

(51) Int. Cl.
*G06V 40/40*     (2022.01)
*G06F 18/22*     (2023.01)
*G06V 40/18*     (2022.01)

(52) U.S. Cl.
CPC .............. *G06V 40/40* (2022.01); *G06F 18/22* (2023.01); *G06V 40/197* (2022.01)

(58) Field of Classification Search
CPC ...... G06V 40/40; G06V 40/197; G06V 10/74; G06F 18/22; G07C 9/37
See application file for complete search history.

(56) References Cited

U.S. PATENT DOCUMENTS

| 8,317,325 | B2 | 11/2012 | Raguin et al. | |
|---|---|---|---|---|
| 2008/0253622 | A1 | 10/2008 | Tosa et al. | |
| 2010/0110374 | A1* | 5/2010 | Raguin | A61B 3/1216 |
| | | | | 382/117 |
| 2014/0016837 | A1* | 1/2014 | Nechyba | G06V 40/45 |
| | | | | 382/118 |

(Continued)

FOREIGN PATENT DOCUMENTS

WO    2008155447 A2    12/2008

OTHER PUBLICATIONS

Connell et al, Fake Iris Detection using Structured Light, 2013, IEEE International Conference on Acoustics, Speech and Signal Processing, pp. 1-5. (Year: 2013).*

(Continued)

*Primary Examiner* — Aaron W Carter
*Assistant Examiner* — Kathleen M Broughton
(74) *Attorney, Agent, or Firm* — Young Basile Hanlon & MacFarlane, P.C.

(57) ABSTRACT

Disclosed herein are methods, apparatus, and systems for iris recognition. A method for weighted spoof contact lens detection includes requesting a subject to roll or tilt head when needing access via an iris recognition device, acquiring, by the iris recognition device, iris images of a rolled head, establishing, by the iris recognition device, a horizontal axis by connecting pupils in an iris image, matching, by the iris recognition device, at least one iris in the iris image to an enrolled iris, determining, by the iris recognition device, whether the horizontal axis is within a rotational variance of an enrolled horizontal axis associated with the enrolled iris, and rejecting, by the iris recognition device, access for the subject when the horizontal axis is greater than the rotational variance of an enrolled horizontal axis.

21 Claims, 8 Drawing Sheets

(56) References Cited

U.S. PATENT DOCUMENTS

| | | | |
|---|---|---|---|
| 2016/0019421 A1 | 1/2016 | Feng et al. | |
| 2017/0364732 A1 | 12/2017 | Komogortsev | |
| 2018/0025207 A1* | 1/2018 | Santos-Villalobos | G06T 5/003 382/117 |
| 2019/0392145 A1* | 12/2019 | Komogortsev | G06F 21/32 |
| 2022/0139115 A1* | 5/2022 | Green | G06V 10/25 382/181 |

OTHER PUBLICATIONS

Yadav et al, Iris Presentation Attack via Textured Contact Lens in Unconstrained Environment, 2018, IEEE Winter Conference on Applications of Computer Vision, pp. 1-9. (Year: 2018).*

Rigas et al, Gaze estimation as a framework for iris liveness detection, 2014, IEEE International Joint Conference on Biometrics, pp. 1-9. (Year: 2014).*

He et al, Efficient Iris Spoof Detection via Boosted Local Binary Patterns, 2009, Advances in Biometrics, pp. 1-12. (Year: 2009).*

Hansen et al, In the Eye of the Beholder: a Survey of Models for Eyes and Gaze, 2010, IEEE Transactions on Pattern Analysis and Machine Intelligence, pp. 1-24. (Year: 2010).*

K. Hughes and K. Bowyer, "Detection of Contact-Lens-Based Iris Biometric Spoofs Using Stereo Imaging," 2013 46th Hawaii International Conf. on System Sci., IEEE Biometrics Compendium. DOI: 10.1109/HICSS.2013.172.

H. Zhang, Z. Sun and T. Tan, "Contact Lens Detection Based on Weighted LBP," 2010 20th International Conf. Pattern Recognition, DOI: 10/1019/ICPR.2010.1040.

Z. Wei, X. Qui, Z, Sun and T. Tan, "Counterfeit iris detection based on texture analysis," 2008 19th International Conf. on Pattern Recognition, DOI 10.1109/ICPR.2008.4761673.

CooperVision "Optimized Toric Lens Geometry for astigmatism", CooperVision, Contact Lens Technology, retrieved Oct. 28, 2021, https://coopervision.com/product-technology/optimized-lens-geometry.

Acuvue "ACUVUE® OASYS Contact Lenses for Astigmatism 2-Week", Johnson & Johnson Vision Care, Inc., Acuvue Products, retrieved Oct. 28, 2021, https://www.acuvue.com/contact-lenses/acuvue-oasys-astigmatism#/product-details.

* cited by examiner

METHOD AND SYSTEM FOR DETECTION OF WEIGHTED CONTACT LENSES IMPRINTED WITH IRIS IMAGES

CROSS-REFERENCE TO RELATED APPLICATION

This application claims priority to and the benefit of U.S. Provisional Patent Application No. 63/106,931, filed Oct. 29, 2020, the entire disclosure of which is hereby incorporated by reference.

TECHNICAL FIELD

This disclosure relates to iris recognition. More specifically, this disclosure relates to detecting iris imprinted, spoofing weighted contact lenses.

BACKGROUND

Individuals can be recognized using a variety of biometric methods, e.g., face, fingerprint, and irises. Some of these biometric methods, such as fingerprint recognition methods, require individuals to touch or contact the biometric recognition device. This can be difficult for some individuals or during periods where users of such biometric recognition systems do not want to touch any surfaces that might have been contaminated by other individuals. Consequently, the use of such biometric recognition systems are shunned.

Biometric recognition systems including iris recognition systems are subject to attempts to spoof the system. These spoofing attempts will increase as the number of valuable resources protected by iris recognition systems increases. A nightmare scenario for iris recognition features a nefarious subject wearing contact lenses that reliably identify them as a different person. Therefore, a means to detect such an attack vector is essential to protect high value resources that use iris recognition access control systems.

SUMMARY

Disclosed herein are methods, apparatus, and systems for iris recognition.

In implementations, a method for weighted spoof contact lens detection includes requesting a subject to roll or tilt head when needing access via an iris recognition device, acquiring, by the iris recognition device, iris images of a rolled head, establishing, by the iris recognition device, a horizontal axis by connecting pupils in an iris image, matching, by the iris recognition device, at least one iris in the iris image to an enrolled iris, determining, by the iris recognition device, whether the horizontal axis is within a rotational variance of an enrolled horizontal axis associated with the enrolled iris, and rejecting, by the iris recognition device, access for the subject when the horizontal axis is greater than the rotational variance of an enrolled horizontal axis.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1A:
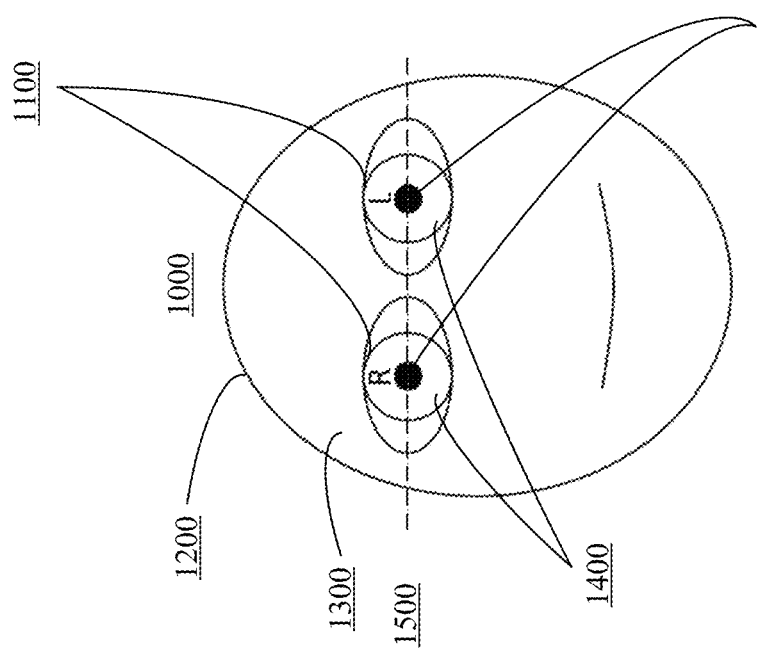
FIG. 1A-1C are diagrams of an example subject with weighted iris patterned contact lenses.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Techniques prior to those described herein for detecting spoof contact lenses suffer from detectability issues. For example, the detection of contact lenses can rely on detection of the subtle circular line defined by the edge of the contact lens that appears just beyond the subject's iris on the sclera. This faint line is difficult to see in the eyes of some subject subjects. And even if detected, a contact lens can be a benign means of correcting vision so merely detecting a contact lens doesn't distinguish 'good' from 'bad' lenses. Detection of contact lenses can also use printing artifacts to identify a spoof such as the dot-matrix array of applied coloration on the lens. However, as contact lens patterning improves, the appearance of such dots has become more difficult to detect. And while cosmetic patterned contact lenses are incompatible with iris detection systems, they are not the nefarious spoof represented by iris pattern imprinted lenses.

Described herein are methods and systems for detecting weighted, iris printed contact lenses. The methods and systems detect spoof contact lenses by using the weighting that fixes the rotational position of the lens on the cornea to correct astigmatism. In implementations, the method detects any patterned contact lens that uses gravity to remain persistently aligned with the subject's eyes and face in a vertical orientation. The methods described herein rely on neither detecting a contact lens edge nor printing artifacts but instead measures the rotational orientation of the iris pattern when the subject rotates their head away from the position for which the spoof contact lenses were designed assuming that the lens rotates due to gravitational force.

In implementations, the methods can use existing and well-established iris recognition methods to establish the rotational position of each iris. For example, the most widely used iris recognition algorithm includes a step to measure the rotational position of the iris. Because iris-patterned spoof contact lenses must be weighted to remain rotationally oriented (unless they are attached to the cornea by a medically impractical and risky method), the described methods expose spoof contact lenses by rotationally reorienting them.

Figure 1B:
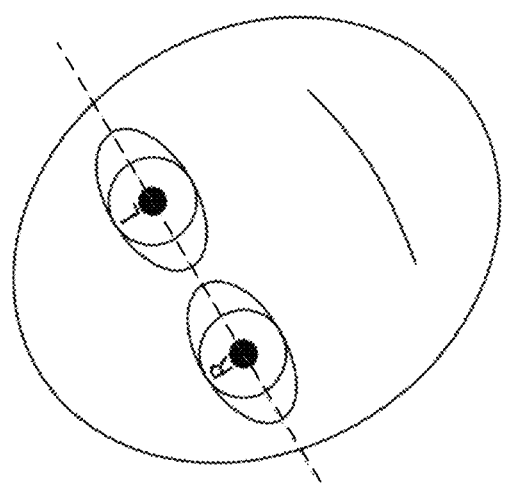
Figure 1C:
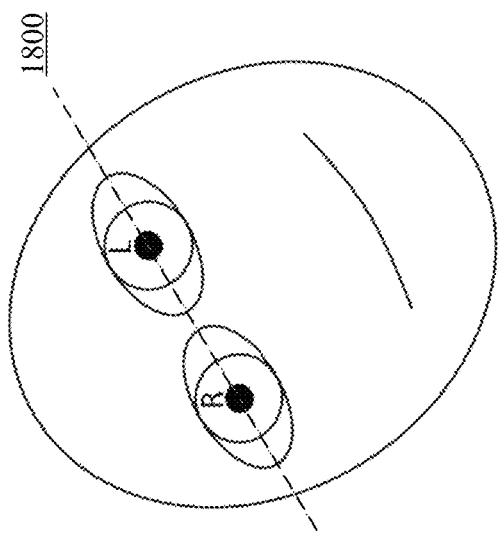

These relationships are shown with respect to FIGS. 1A-1C, which are diagrams of an example subject 1000 with weighted iris patterned contact lenses 1100. Weighted contact lenses are generally worn to address astigmatism. FIG. 1A is a diagram of the subject 1000 wearing the weighted iris patterned contact lenses 1100. In this instance, a head 1200, face 1300, and an iris and/or iris texture (denoted as R for right eye and L for left eye) 1400 are in a vertical position. Dashed line 1500 represents horizontal axes with respect to the face 1300 that connect right and left pupils 1600. FIG. 1B is a diagram of the subject 1000 captured immediately after rolling the head 1200 in one direction. As shown, the head 1200, the face 1300, and the iris and/or iris texture 1400, and a dashed line 1700 are all tilted. FIG. 1C is a diagram of the subject 1000 captured sometime after rolling the head 1200 in one direction. As shown, the head 1200, the face 1300, and a dashed line 1800 are all tilted.

However, the iris and/or iris texture 1400 is vertical because the weighted iris patterned contact lenses 1100 have reoriented under the force of gravity. Detection of the FIG. 1C orientation after detection of the FIG. 1B orientation after a defined time period determines the presence of spoof weighted contact lenses.

It is noted that a real iris pattern of an eye is fixed in its rotational position relative to a subject's face. In other words, a freckle on the edge of an iris that is positioned at 12 o'clock when a subject's face is vertically oriented rotates along with the rest of the iris pattern by 90° when the subject rolls their head by 90°. Thus, to be successful, a spoof iris pattern on an iris-patterned contact lens must rotate exactly as a natural iris rotates. Otherwise, it can be distinguished as a spoof iris. In addition, a contact lens spoof imprinted with a realistic iris pattern must persist in the rotational orientation of the iris pattern that it is spoofing. For contact lenses, this means that the lens must be weighted to maintain stable rotational orientation (assuming that the lens cannot be safely fixed to the cornea of the user). This collectively creates a problem for a spoof contact lens since the contact lens must rotate with the user's face (and remain aligned with the face orientation) when a user rotates their head and the weight that uses gravity to maintain the alignment of a spoof contact lens will force the lens to drift unnaturally when the user's head is rotated (rolled) from a vertical position.

It is noted that commercially available contact lenses already boast of their ability to remain aligned with a vertically oriented face. CooperVisions's Biofinity® toric and XR toric lenses as well as Acuvue's® Oasys contact lenses use systems of weighting to "quickly orient the lens for better performance", that is, to maintain rotational orientation of the contact lenses used to correct astigmatism. On the eyes of a subject whose head is oriented vertically, the weight on each contact lens "iris stabilizes" the lens on the cornea so that it orients due to the pull of gravity following blinks and sudden eye motion. In doing so, the rotationally dependent astigmatic correction properly aligns with the subject's eye if the user's head is vertical. A similarly weighted spoof contact lens would orient properly relative to gravity on the eye of a nefarious subject who might successfully spoof an iris recognition system that simply requires presentation with a user's head oriented vertically.

However, if the subject rolls their head to one side or the other, say by 30° and then pauses while gravity reorients the rotational orientation of their contact lenses, the rotational position of the spoof contact lens will no longer be correctly oriented relative to the subject's face. Operationally, the reoriented iris patterns would no longer align with an axis connecting the subject's two pupils which is fixed relative to the subject's face. Consequently, an iris recognition system needs to examine the rotational position of the irises on the subject with head rolled to one side to detect weighted contact lenses. And since weighting is necessary to maintain the orientation of iris-patterned spoof contact lenses through the day, head-rolling is a means to expose this sophisticated spoof. In implementations, likelihood of detecting iris-patterned spoof contact lenses can be increased by comparing the rotational position of each of two irises to corresponding enrolled reference irises or comparing the rotational position of each of two iris-patterned to one another after a subject rolls their head to one side and waits for gravity to reorient spoof contact lenses. Each of the methods operate with respect to iris-patterned spoof contact lenses that are weighted and wait for gravity to rotationally reorient the spoof contact lenses on the rolled head of a subject after a reasonably short time.

Figure 2:
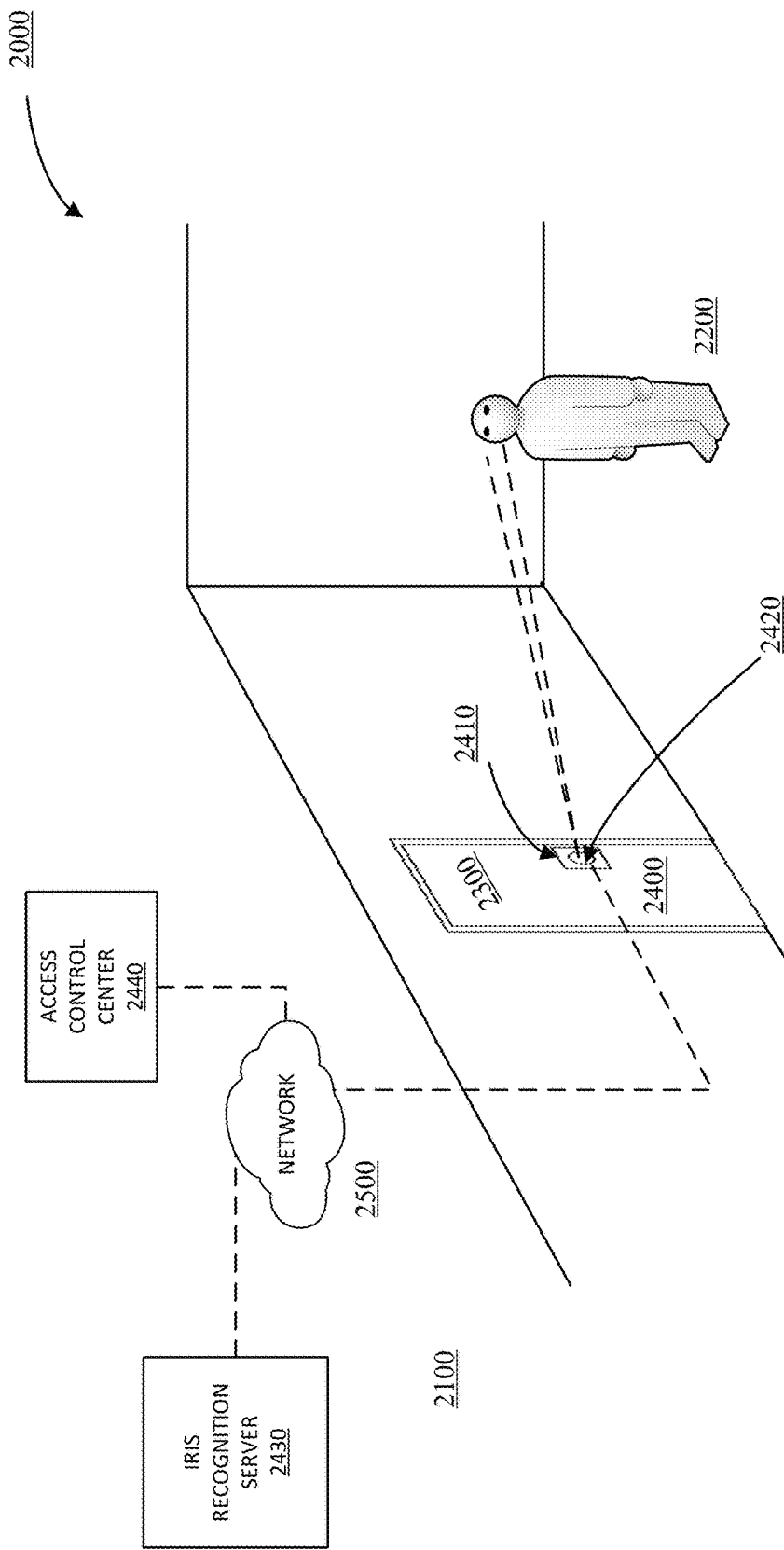
FIG. 2 is a diagram of an example architecture for iris recognition in accordance with implementations of this disclosure.

FIG. 2 is a diagram of an example architecture or system 2000 for iris recognition in accordance with implementations of this disclosure. In implementations, the architecture or system 2000 can be deployed, provided, or implemented in warehouses, offices, buildings, residences, hospitals, nursing homes, rehabilitation centers, vaults, airports, concerts, and other facilities or events. In implementations, the architecture 2000 can include a room or building 2100, which is accessed by a user 2200 via a door 2300. The door 2300 is illustrative of an access controlled facility, object, and the like (collectively "access controlled entity"). The door 2300 can be opened or unlocked by an access control system 2400. In implementations, the access control system 2400 includes an iris recognition device 2410 and an access control module 2420. In implementations, the access control system 2400 includes the iris recognition device 2410, the access control module 2420, and an iris recognition server 2430. In implementations, the access control system 2400 includes the iris recognition device 2410, the access control module 2420 and an access control center 2440. In implementations, the access control system 2400 includes the iris recognition device 2410, the access control module 2420, the iris recognition server 2430, and the access control center 2440. In implementations, the iris recognition device 2410, the access control module 2420, the iris recognition server 2430, and the access control center 2440, as appropriate and applicable, are connected or in communication (collectively "connected") using a network 2500. The architecture 2000 may include other elements, which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The iris recognition device 2410 is a touchless and contactless device for recognizing a user. The iris recognition device 2410 captures one or more images of the user 2000. The one or more images include an eye comprising an iris and a pupil. The iris recognition device 2410 can determine if the user 2000 is wearing weighted, iris printed contacts lenses in an attempt to spoof the iris recognition device 2410 as described herein. An alarm signal is generated if a spoof is detected. The iris recognition device 2410 can signal the access control module 2420, the access control center 2440, the iris recognition server 2430, or combinations thereof. The iris recognition device 2410 can generate iris templates if the iris recognition device 2410 determines it is not a spoof. The iris templates are matched against enrolled iris templates to determine if the user 2000 has access. An access signal is generated based on the results of the matching. In an implementation, the iris recognition device 2410 is a standalone device. In an implementation, the iris recognition device 2410 can communicate with the iris recognition server 2430 and the access control center 2440 to collectively determine access based on the matching results.

The access control module 2420 can receive the access signal from the iris recognition device 2410. The access control module 2420 can open or unlock the door 2300 based on the access signal. In implementations, the access control module 2420 can send a signal to a lock/unlock device (not shown) on the door 2300 to open or unlock. In implementations, the access control module 2420 can receive the access signal from the access control center 2440. In implementations, the access control module 2420 can receive the access signal from the iris biometric recognition server 2430. In implementations, the access control module 2420 can receive the access signal from a combination of the iris recognition device 2410, the iris recognition server 2430, and the access control center 2440. In implementations, the access control module 2420 can receive an alarm signal from the iris recognition device 2410, the access control center 2440, the iris recognition server 2430, or combinations thereof. In implementations, the access control module 2420 can generate an alarm based on the alarm signal. The alarm can be a light, an audible alarm, a silent alarm, and the like. In implementations, the access control module 2420 is integrated with the iris recognition device 2410. In implementations, the access control module 2420 is integrated with the door 2300. In implementations, the access control module 2420 is a standalone device in communication with the iris recognition device 2410, the door 2300, the iris recognition server 2430, the access control center 2440, or combinations thereof.

The iris recognition server 2430 can receive captured images from the iris recognition device 2410. The iris recognition server 2430 can perform iris recognition as described herein for the iris recognition device 2410. The iris recognition server 2430 can communicate alarms and results to the iris recognition device 2410, the access control module 2420, the access control center 2440, or combinations thereof.

The access control center 2440 can be smart monitors, smartphones, computers, desktop computers, handheld computers, personal media devices, notebooks, notepads, tablets, and the like which can communicate between the iris recognition device 2410, the access control module 2420, the iris recognition server 2430, or combinations thereof. The access control center 2440 can review the results from the matching by the iris recognition device 2410, the iris recognition server 2430, or combinations thereof to determine what access signal should be sent to the access control module 2420. In implementations, the access control center 2440 can receive an alarm signal from the iris recognition device 2410, the iris recognition server 2430, the access control module 2420, or combinations thereof. In implementations, the access control center 2440 can generate an alarm based on the alarm signal. The alarm can be a light, an audible alarm, a silent alarm, and the like.

The network 2500 may be, but is not limited to, the Internet, an intranet, a low power wide area network (LP-WAN), a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof.

Figure 3:
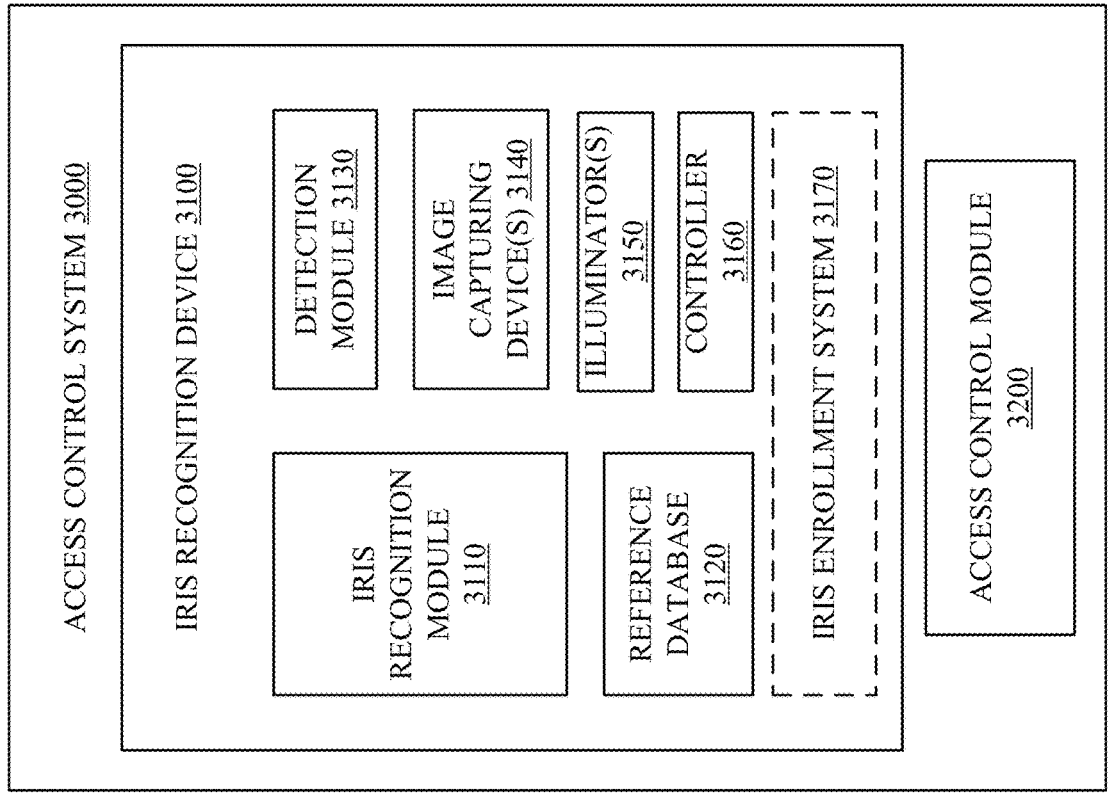
FIG. 3 is a diagram of an example access control system with an example iris recognition device in accordance with implementations of this disclosure.

FIG. 3 is a diagram of an example access control system 3000 with an example iris recognition device 3100 in accordance with implementations of this disclosure. The access control system 3000 can include the iris recognition device 3100 in communication with an access control module 3200. The iris recognition device 3100 can include an iris recognition module 3110, a reference database 3120, a detection module 3130, one or more image capturing device(s) 3140, one or more illuminator(s) 3150, and a controller 3160. In implementations, the iris recognition device 3100 can include an iris enrollment system 3170. In implementations, the iris recognition device 3100 and the access control module 3200 can be an integrated device. In implementations, the iris recognition device 3100 and the access control module 3200 can be connected standalone devices. The access control system 3000 may include other elements, which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The detection module 3130 can be a motion sensor, a proximity sensor, and like device which can determine the presence of an individual or whether an individual is proximate to an access controlled entity. The detection module 3130 can awaken or signal the access control system 3000, the iris recognition device 3100, or combinations thereof of the presence of the individual. In implementations, the access control system 3000 can be in a low power mode or on persistently to perform scanning. Activation of the access control system 3000 occurs when the scanning finds a scannable object.

The one or more image capturing device(s) 3140 can be a camera, an imager, or like device for capturing one or more images of the individual. In implementations, the one or more image capturing device(s) 4140 is a near infrared image capturing device, a visible image capturing device, or combinations thereof.

The one or more illuminator(s) 3150 can be one or more light sources, light emitting diodes, and the like which can illuminate the individual in coordination with capturing an image of the individual. In implementations, the one or more illuminator(s) 3150 can be visible light sources including ambient light, visible light emitting diodes (LEDs), near infrared light sources including ambient light, near infrared light emitting diodes (LEDs), and the like.

The iris recognition module 3110 can perform iris recognition on the captured images as described herein. In implementations, the iris recognition module 3110 determines if a spoof contact lens is being used and if not, generates appropriate or applicable iris templates, representations, or the like, and matches the iris templates to enrolled templates stored in the reference database 3120. The iris recognition module 3110 can send matching results to the access control module 3200. In implementations, the results can be scores, a decision, or combinations thereof. If a spoof is detected, an alarm can be generated or an alarm signal can be sent as described herein.

The reference database 3120 can include iris templates, and other like templates for individuals enrolled in the access control system 3000.

The controller 3160 can control and coordinate the operation of the detection module 3130, the one or more image capturing device 3140, the one or more illuminator(s) 3150, and if applicable, the iris enrollment system 3170.

The iris enrollment system 3170 can enroll individuals into the access control system 3000. The one or more image capturing device(s) 3140 and the one or more illuminator(s) 3150 can capture images of individuals which are processed by the iris recognition module 3110 to generate iris templates. The iris templates can then be stored in the reference database 3120 for matching analysis by the iris recognition module 3110.

The access control module 3200 can receive matching results from the iris recognition device 3100. If a positive match occurs, the access control module 3200 can open or unlock the access controlled entity for the individual or send a signal to the access controlled entity, which in turn can cause the access controlled entity to open or unlock. In implementations, the access control module 3200 can access other security systems to determine security, access, authorization levels or the like for a matched individual. That is, the iris recognition is one of multiple steps in providing access to a secured asset. The access control module 3200 can receive alarm signals as described herein and process accordingly.

Figure 4:
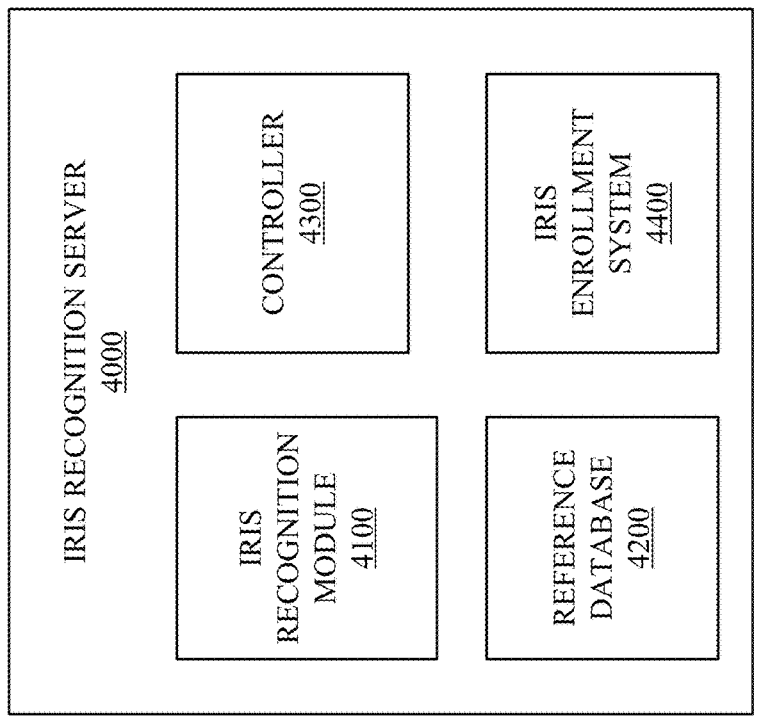
FIG. 4 is a diagram of an example iris recognition server for use with the access control system of FIG. 3 in accordance with implementations of this disclosure.

FIG. 4 is a diagram of an example iris recognition server for use with the access control system of FIG. 3 in accordance with implementations of this disclosure. The iris recognition server 4000 can include an iris recognition module 4100, a reference database 4200, a controller 4300, and an iris enrollment system 4400. The iris recognition server 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The iris recognition server 4000 can communicate with the access control system 3000, the iris recognition device 3100, the access control module 4200, and combinations thereof via a network such as network 2500. The iris recognition module 4100 can operate as described for iris recognition module 3110. The reference database 4200 can operate as described herein for the reference database 3120. The controller 4300 can control and coordinate the operation of the iris recognition device 3100, the access control module 3200, the iris recognition module 4100, the reference database 4200, the iris enrollment system 4400, and combinations thereof.

Figure 5:
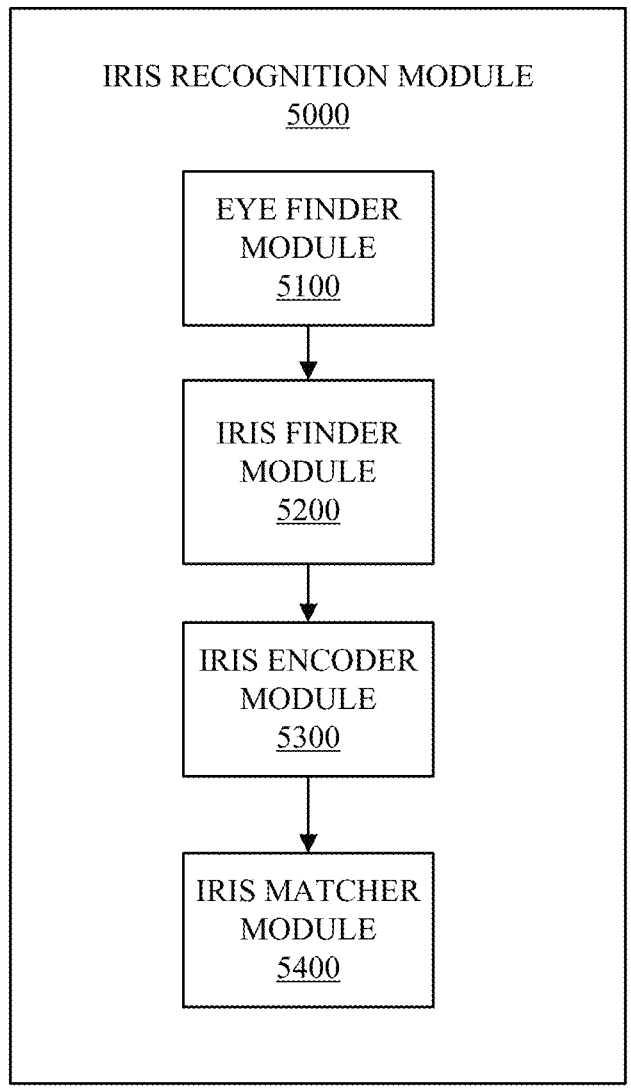
FIG. 5 is a diagram of an example configuration of an iris recognition device in accordance with implementations of this disclosure.

FIG. 5 is a diagram of an example iris recognition module 5000 in accordance with implementations of this disclosure. In implementations, the iris recognition module 5000 is the iris recognition module 3110 in FIG. 3 and the iris recognition module 4100 in FIG. 4. The iris recognition module 5000 can include an eye finder 5100, an iris finder module 5200, an iris encoder module 5300, and an iris matcher module 5400.

The iris recognition module 5000 can process two types of images, straight head image(s) and when appropriate, tilted or rolled head image(s). In implementations, when the straight analysis is successful, the user or subject can be asked to tilt or roll their head to one side by ΔθROLL, e.g., 30° (rotating about an axis running from front to back) for a defined interval Δτ, e.g. 10 to 30 seconds. For example, this is shown in FIG. 1B. In this instance, the user can be asked to keep their eyes open for a substantial portion of the defined interval. The defined interval permits any weighted spoof contact lenses to reorient on the subject's eyes.

The eye finder module 5100 can locate or find one or more eyes of a subject in the straight image(s) that contains at least an appropriate portion of a face of the subject using conventional techniques. An appropriate portion can refer to having on or more landmarks to determine the one or more eyes of the subject. The eye finder module 5100 can determine or establish a horizontal axis (or first horizontal axis when appropriate) relative to the subject's face, e.g., using a line through the center of each pupil. For example, this is shown in FIG. 1A as dashed line 1500. In implementations, the eye finder module 5100 can locate one or more eyes of a subject in the tilted image(s) that contains at least an appropriate portion of a face of the subject using conventional techniques. The eye finder module 5100 can determine or establish a second horizontal axis relative to the subject's face, e.g., using a line through the center of each pupil. For example, this is shown in FIG. 1C as dashed line 1800.

The iris finder module 5200 can operate on or process the located eyes for the straight head image to find the iris(es) using conventional techniques. The iris finder module 5200 segments the iris from the pupil using conventional techniques. In implementations, the iris finder module 5200 can operate on or process the located eyes for the tilted head image to find the iris(es) using conventional techniques. The iris finder module 5200 segments the iris from the pupil using conventional techniques.

The iris encoder module 5300 can encode the segmented iris relative to the horizontal axis for the straight head image using conventional techniques. The iris encoder module 5300 can generate a straight head digitized iris template from the encoded iris. In implementations, the iris encoder module 5300 can encode the segmented iris relative to the second horizontal axis for the tilted head image using conventional techniques.

The iris matcher module 5400 can compare the iris template(s) against iris enrolled templates and provide iris match scores. The iris matcher module 5400 can check that the iris patterns match to enrolled iris images and that the rotational orientation of the iris images match the rotational orientation of enrolled iris images (relative to the face horizontal axis) to within a given angular tolerance ΔθTOL, e.g., ±10 degrees, and if not, reject the subject. In implementations, when the straight head analysis is successful, the iris matcher module 5400 can compare the rotational position of the tilted head iris images (relative to the second horizontal axis) to the rotational position of enrolled irises or to the rotational position of straight up iris images (relative to the nominally level, first horizontal axis) to detect unnatural rotation of the iris patterns on the subject's eyes. The iris matcher module 5400 can reject the subject and generate an alarm if unnatural rotation is detected or can accept the subject as legitimately recognized.

Figure 6A:
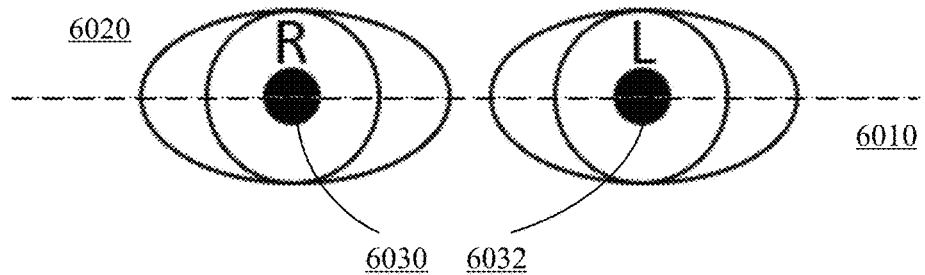
FIG. 6A-6E are diagrams of an example subject with enrolled iris templates and another subject with weighted iris patterned contact lenses.
Figure 6B:
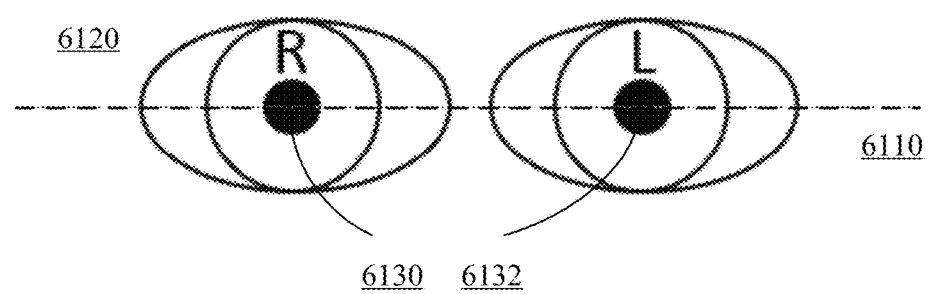
Figure 6C:
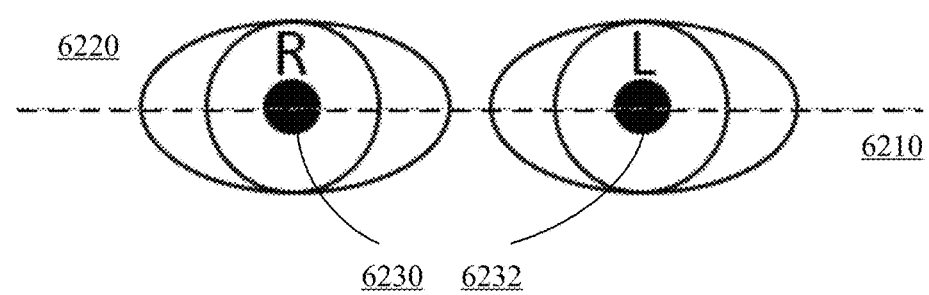
Figure 6D:
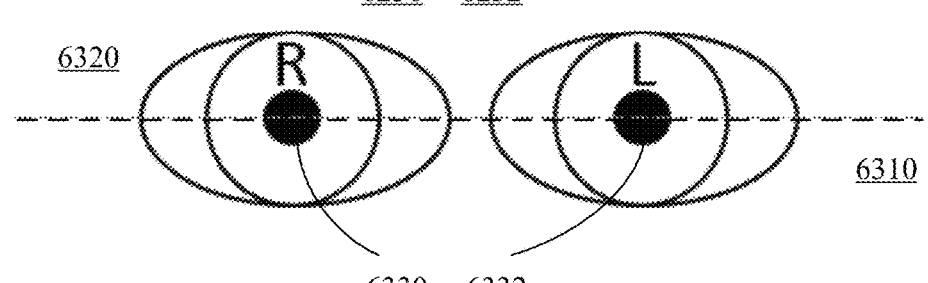
Figure 6E:
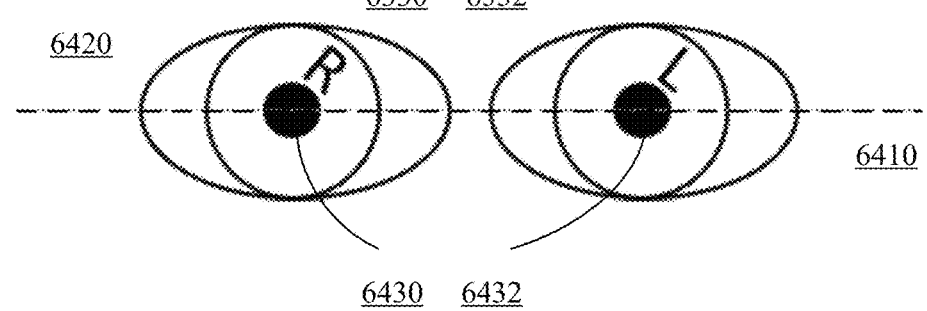

An operational discussion of FIGS. 1-5 is described with respect to FIGS. 6A-6E, which are diagrams of an example subject with enrolled iris templates and another subject with weighted iris patterned contact lenses to spoof the subject. FIG. 6A are diagrams of enrolled iris images 6000 of right and left eyes. FIG. 6B are diagrams of iris images 6100 of a subject without spoof contacts immediately after head roll. FIG. 6C are diagrams of iris images 6200 of a subject without spoof contacts after a time interval defined interval Δτ. FIG. 6D are diagrams of iris images 6300 of a subject with spoof contact lenses immediately after head roll. FIG. 6E are diagrams of iris images 6400 of a subject with spoof contact lenses after the defined interval Δτ. Iris images are shown relative to a horizontal axis (6010, 6110, 6210, 6310, and 6410) (dashed line) relative to the face (6020, 6120, 6220, 6320, and 6420) that connects right and left pupils (6030,6032, 6130,6132, 6230,6232, 6330,6332, and 6430, 6432). Note that the rotational orientation of E matches neither FIG. 6A (enrolled) nor FIG. 6D (immediately after head roll) as described herein.

Operationally, with reference to FIGS. 1-6E, an individual 2200 self-aligns to a camera configuration as described herein in an iris recognition device. The camera(s), in conjunction with the illuminator(s) can produce an image or set of images of the individual 2200. Each captured image or frame is submitted for eye location determination as performed by the eye finder module 5100, for example. The eye finder module 5100 can establish a horizontal axis relative to the subject's face (can be referred to as first horizontal axis when appropriate), e.g., using a line through the center of each pupil. Conventional iris pattern analysis can be applied to the iris images to encode each iris relative to the determined horizontal line. Iris matching can be performed against enrolled iris images such as the iris images 6000 shown in FIG. 6A and to check the rotational orientation of the iris images against the rotational orientation of matched, enrolled iris images (relative to the face horizontal axis) to within a given angular tolerance $\Delta\theta TOL$, e.g., ±10 degrees. If the iris pattern does not match, or the rotation orientation is greater than the angular tolerance $\Delta\theta TOL$, then the subject is rejected and an alarm can be generated.

In the event of a successful iris match and acceptable rotation orientation, then the subject can be asked to perform a head roll. For example, the subject can be asked to roll their head to one side by $\Delta\theta ROLL$, e.g., 30° (rotating about an axis running from front to back) for a defined interval $\Delta\tau$, e.g. 10 to 30 seconds with the subject keeping their eyes open for a substantial portion of the time. The defined interval $\Delta\tau$ permits weighted spoof contact lenses, if being worn, to reorient on the subject's eyes.

The head roll images can be processed similarly as above. That is, the eyes can be located in the head roll images and a second horizontal axis can be determined relative to the subject's face with head rolled. Conventional iris pattern analysis can be applied to head roll iris images to encode each iris relative to the determined second horizontal line.

Head roll iris images can be matched against enrolled iris images and the rotational position of head roll iris images (relative to the second horizontal axis) can be compared to the rotational position of enrolled irises, e.g., FIG. 6A versus FIG. 6E, or to the rotational position of the successfully matched iris images (relative to the nominally level, first horizontal axis) to detect unnatural rotation of the iris patterns on the subject's eyes, e.g., FIG. 6D versus 6E. Images are being continuously captured or acquired. If unnatural rotation is detected (either FIG. 6A versus FIG. 6E or FIG. 6D vs. 6E), then the iris recognition device can reject the subject, otherwise the iris recognition device can accept the subject as legitimately recognized, e.g., either FIG. 6A versus FIG. 6C or FIG. 6A versus FIG. 6B. In this instance, an image(s) is captured immediately after the head roll and another image(s) is captured after a period of time. These images are processed as described herein for purposes of detecting weighted spoof contact lenses. The period of time enables a temporal aspect for weighted contact lenses, if present, to settle due to gravity.

Figure 7:
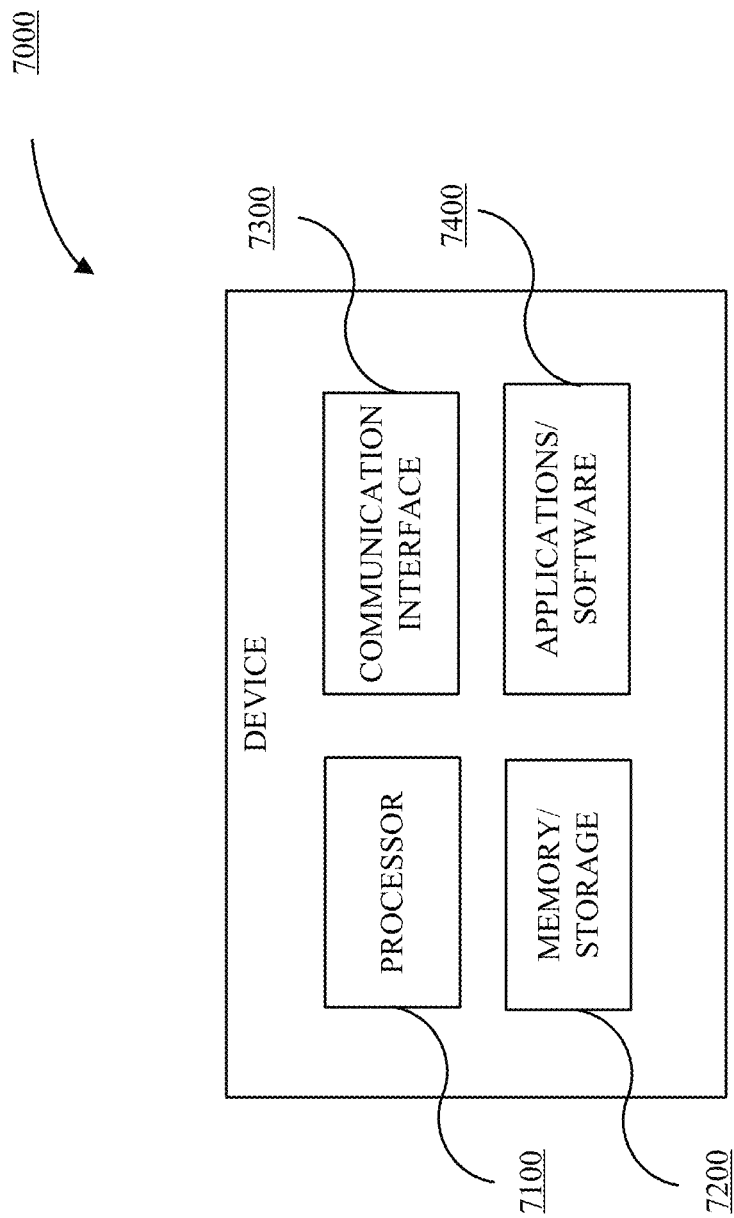
FIG. 7 is a block diagram of an example of a device in accordance with implementations of this disclosure.

FIG. 7 is a block diagram of an example of a device 7000 in accordance with embodiments of this disclosure. The device 7000 may include, but is not limited to, a processor 7100, a memory/storage 7200, a communication interface 7300, and applications 7400. The device 7000 may include or implement, for example, the access control system 2400, the iris recognition device 2410, the access control module 2420, the iris recognition server 2430, the access control center 2440, the access control system 3000, the iris recognition device 3100, the access control module 3200, the iris recognition module 3110, the reference database 3120, the detection module 3130, the one or more image capturing device(s) 3140, the one or more illuminator(s) 3150, the controller 3160, the iris enrollment system 3170, the iris recognition server 4000, the iris recognition module 4100, the reference database 4200, the controller 4300, the iris enrollment system 4400, the iris recognition module 5000, the eye finder module 5100 the iris finder module 5200, the iris encoder module 5300, and the iris matcher module 5400, for example. In an implementation, appropriate memory/storage 7200 may store the image(s), the iris information, the iris template(s), iris match scores, and the list of matched scores. In an implementation, appropriate memory/storage 7200 is encoded with instructions for at least iris recognition and access control. The iris recognition techniques or methods described herein may be stored in appropriate memory/storage 7200 and executed by the appropriate processor 7100 in cooperation with the memory/storage 7200, the communications interface 7300, and applications 7400, as appropriate. The device 7000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 8:
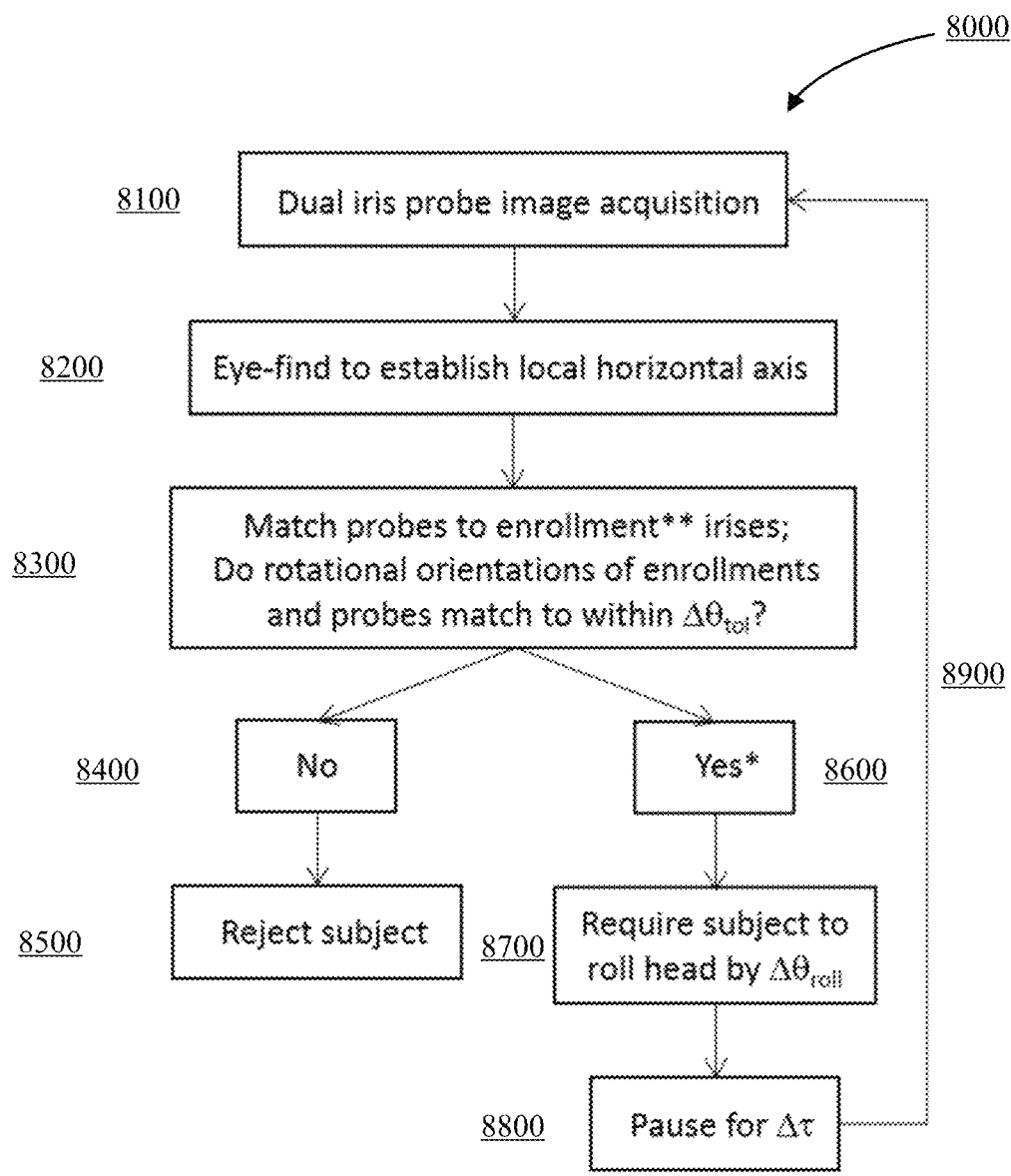
FIG. 8 is a flowchart of an example method for detecting a spoof contact lens in accordance with implementations of this disclosure.

FIG. 8 is a flowchart of an example method 8000 for detecting a weighted spoof contact lens in accordance with implementations of this disclosure. The method 8000 includes: acquiring 8100 iris images; establishing 8200 horizontal axis for an iris image; for first pass, matching 8300 irises to enrolled irises including rotational variance, and for second pass, matching 8300 irises to enrolled irises and/or irises from first pass including rotational variance; when no match 8400, rejecting 8500 subject; and for first pass, when yes 8600, requesting 8700 subject to perform head roll for a defined time 8800 and return to image acquisition 8900, and for second pass, when yes 8600 accept subject. The method 8000 can be implemented using at least one of the access control system 2400, the iris recognition device 2410, the access control module 2420, the iris recognition server 2430, the access control center 2440, the access control system 3000, the iris recognition device 3100, the access control module 3200, the iris recognition module 3110, the reference database 3120, the detection module 3130, the one or more image capturing device(s) 3140, the one or more illuminator(s) 3150, the controller 3160, the iris enrollment system 3170, the iris recognition server 4000, the iris recognition module 4100, the reference database 4200, the controller 4300, the iris enrollment system 4400, the iris recognition module 5000, the eye finder module 5100 the iris finder module 5200, the iris encoder module 5300, the iris matcher module 5400, the device 7000, the processor 7100, the memory/storage 7200, the communication interface 7300, and the applications 7400, for example.

The method 8000 includes acquiring 8100 iris images. Iris images are acquired or captured from a subject with a head in a straight ahead position (first pass). In implementations, when the straight ahead irises match, iris images are acquired or captured from the subject with the head in a tilted or rolled position (second pass). Image(s) are captured immediately after the head roll and after a period of time. The period of time provides the weighted contact lenses, if present, to settle due to gravity. These images are processed as described herein for purposes of detecting weighted spoof contact lenses.

The method 8000 includes establishing 8200 horizontal axis for an iris image. A horizontal axis is determined using the pupils in the iris images.

The method 8000 includes a for first pass, matching 8300 irises to enrolled irises including rotational variance, and for a second pass, matching 8300 irises to enrolled irises and/or irises from first pass including rotational variance. The straight ahead irises (first pass) are matched against enrolled irises to determine an iris match. This includes determining whether the irises are within a rotational variance. In implementations, the head rolled irises (second pass) are compared against the enrolled irises and/or the straight ahead irises from the first pass to determine an iris match. This includes determining whether the irises are within a rotational variance. Rotational variances are determined by using a horizontal axis of the enrolled iris, a horizontal axis of the straight ahead iris image, and a horizontal axis of the rolled head iris image, as applicable and appropriate.

The method 8000 includes when no match 8400, rejecting 8500 subject. If at least one of the straight ahead irises don't match, the straight ahead irises have a rotation greater than the rotational variance, the head rolled irises don't match, the head rolled irises have a rotation greater than the rotational variance, then the subject fails and alert processing is performed.

The method 8000 includes for a first pass, when yes 8600, requesting 8700 subject to perform head roll for a defined time 8800 and return to image acquisition 8900, and for a second pass, when yes 8600 accept subject. A two level or stage iris check is performed for the subject. A straight ahead position and when applicable, a head rolled position. If the subject passes both, then the subject is approved or accepted.

Figure 9:
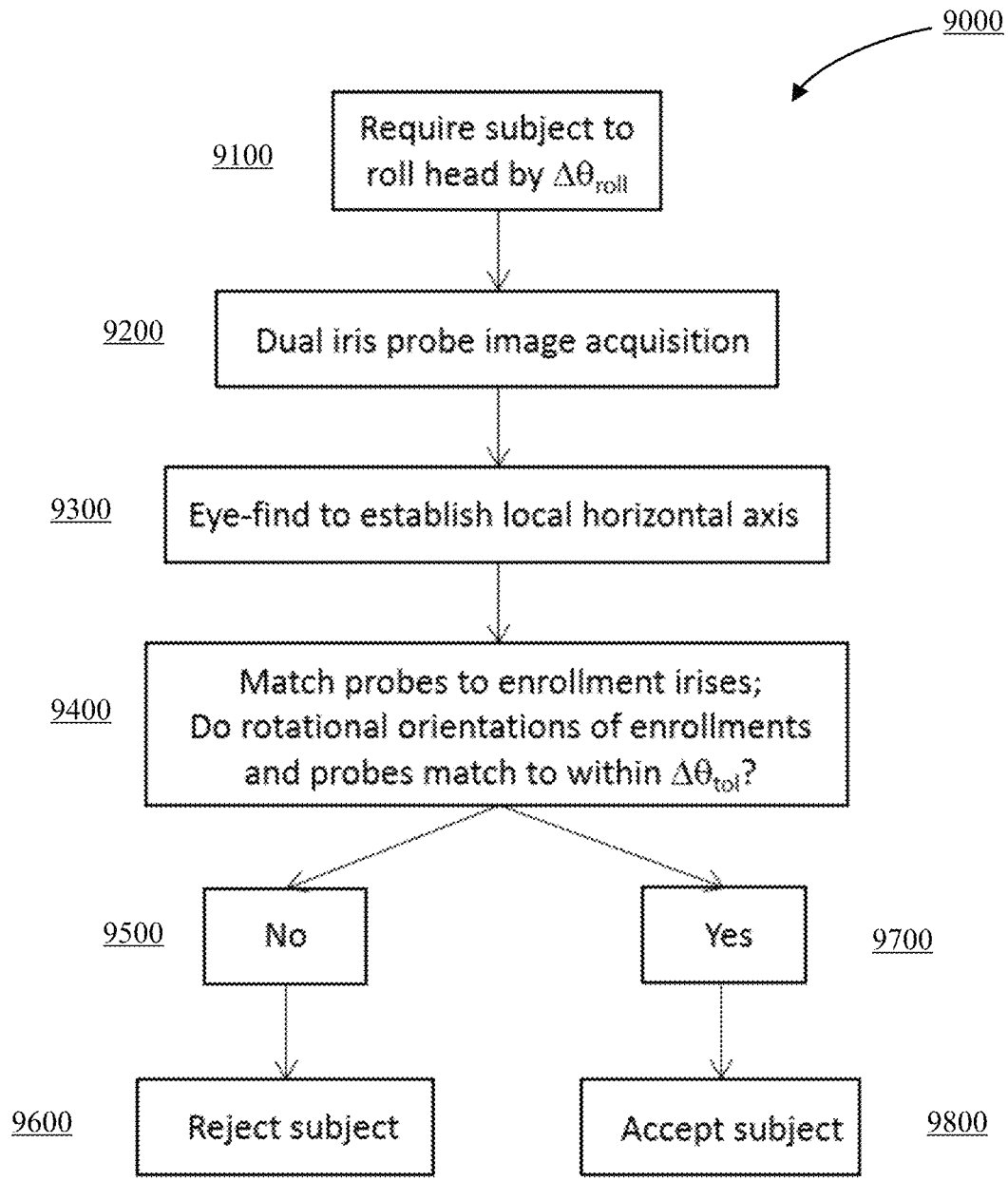
FIG. 9 is a diagram of example method for detecting a spoof contact lens in accordance with implementations of this disclosure.

FIG. 9 is a diagram of example method 9000 for detecting a weighted spoof contact lens in accordance with implementations of this disclosure. The method 9000 includes: requesting 9100 subject to roll or tilt head; acquiring 9200 iris images; establishing 9300 horizontal axis for an iris image; matching 9400 irises to enrolled irises including rotational variance; when no match 9500, rejecting 9600 subject; when yes 9700, accepting 9800 subject. The method 9000 can be implemented using at least one of the access control system 2400, the iris recognition device 2410, the access control module 2420, the iris recognition server 2430, the access control center 2440, the access control system 3000, the iris recognition device 3100, the access control module 3200, the iris recognition module 3110, the reference database 3120, the detection module 3130, the one or more image capturing device(s) 3140, the one or more illuminator(s) 3150, the controller 3160, the iris enrollment system 3170, the iris recognition server 4000, the iris recognition module 4100, the reference database 4200, the controller 4300, the iris enrollment system 4400, the iris recognition module 5000, the eye finder module 5100 the iris finder module 5200, the iris encoder module 5300, the iris matcher module 5400, the device 7000, the processor 7100, the memory/storage 7200, the communication interface 7300, and the applications 7400, for example.

The method 9000 includes requesting 9100 subject to roll or tilt head. A subject is requested to roll their head a defined amount when requiring access.

The method 9000 includes acquiring 9200 iris images. Iris images are captured with the subject's head in a rolled position. Image(s) are captured immediately after the head roll and after a period of time. The period of time provides the weighted contact lenses, if present, to settle due to gravity. These images are processed as described herein for purposes of detecting weighted spoof contact lenses.

The method 9000 includes establishing 9300 horizontal axis for an iris image. A horizontal axis is determined using the pupils in the iris images.

The method 9000 includes matching 9400 irises to enrolled irises including rotational variance. The head rolled irises are compared against enrolled irises to determine an iris match. This includes determining whether the irises are within a rotational variance by using the horizontal axis.

The method 9000 includes when no match 9500, rejecting 9600 subject. If the irises don't match, the irises have a rotation greater than a rotational variance, or both, then the subject fails and alert processing is performed.

The method 9000 includes when yes 9700, accepting 9800 subject. If the irises match and the irises have a rotation equal or less than the rotational variance, then the subject passes and access processing is performed.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for weighted spoof contact lens detection, the method comprising:
   requesting a subject to roll or tilt head when needing access via an iris recognition device;
   waiting, by the iris recognition device, for a period of time after the head is rolled to acquire the iris images, wherein the period of time permits weighted spoof contact lenses to reorient on the subject's eyes;
   acquiring, by the iris recognition device, iris images of a rolled head after the period of time elapses;
   establishing, by the iris recognition device, a horizontal axis by connecting pupils in an iris image;
   matching, by the iris recognition device, at least one iris in the iris image to an enrolled iris;
   determining, by the iris recognition device, whether the horizontal axis is within a rotational variance of an enrolled horizontal axis associated with the enrolled iris; and
   rejecting, by the iris recognition device, access for the subject when the horizontal axis is greater than the rotational variance of the enrolled horizontal axis.

2. The method of claim 1, wherein the period of time is at least 10 seconds.

3. The method of claim 1, further comprising:
   accepting, by the iris recognition device, the subject for access processing when at least one iris matches the enrolled iris and the horizontal axis is within the rotational variance of the enrolled horizontal axis.

4. The method of claim 1, further comprising:
   accepting, by the iris recognition device, the subject for access processing when both irises match enrolled irises and each horizontal axis is within the rotational variance of a respective enrolled horizontal axis.

5. The method of claim 1, further comprising:
   rejecting, by the iris recognition device, access for the subject when each horizontal axis is greater than the rotational variance of a respective enrolled horizontal axis.

6. The method of claim 1, further comprising:
   rejecting, by the iris recognition device, access for the subject when both irises fail to match enrolled irises.

7. The method of claim 1, wherein the requesting is initiated by the iris recognition device when at least one non-rolled head iris matches the enrolled iris and a non-rolled head horizontal axis is within a rotational variance of the enrolled horizontal axis.

8. The method of claim 1, wherein the requesting is initiated by the iris recognition device when both non-rolled head irises match enrolled irises and a non-rolled head horizontal axis is within a rotational variance of a respective enrolled horizontal axis.

9. The method of claim 8, wherein the determining further comprising:
   determining, by the iris recognition device, whether the horizontal axis is within a rotational variance of the non-rolled head horizontal axis.

10. The method of claim 9, wherein the determining further comprising:
    accepting, by the iris recognition device, the subject for access processing when both irises match enrolled irises and the horizontal axis is within the rotational variance of a respective enrolled horizontal axis and the horizontal axis is within the rotational variance of a respective non-rolled head horizontal axis.

11. A method for weighted spoof contact lens detection, the method comprising:
    acquiring, by an iris recognition device, non-rolled head iris images of a subject needing access;
    establishing, by the iris recognition device, a non-rolled head horizontal axis by connecting pupils in a non-rolled head iris image;
    matching, by the iris recognition device, at least one iris in the non-rolled head iris image to an enrolled iris;

determining, by the iris recognition device, whether the non-rolled head horizontal axis is within a rotational variance of an enrolled horizontal axis associated with the enrolled iris;

waiting by the iris recognition device, for a period of time after a head is rolled to acquire rolled head iris images, wherein the period of time permits weighted spoof contact lenses to reorient on the subject's eyes;

acquiring, by an iris recognition device, rolled head iris images of the subject when the at least one iris in the non-rolled head iris image matches the enrolled iris and the non-rolled head horizontal axis is within the rotational variance of a respective enrolled horizontal axis and after the waiting a period of time has elapsed;

establishing, by the iris recognition device, a rolled head horizontal axis by connecting pupils in a rolled head iris image;

matching, by the iris recognition device, at least one iris in the rolled head iris image to the enrolled iris;

determining, by the iris recognition device, at least one of whether the rolled head horizontal axis is within the rotational variance of the enrolled horizontal axis or whether the rolled head horizontal axis is within the rotational variance of the non-rolled horizontal axis; and rejecting, by the iris recognition device, access for the subject when at least one of the rolled horizontal axis is greater than the rotational variance of the enrolled horizontal axis or the rolled horizontal axis is greater than the rotational variance of the non-rolled horizontal axis.

12. The method of claim 11, wherein the period of time is at least 10 seconds.

13. The method of claim 11, further comprising:
accepting, by the iris recognition device, the subject for access processing when at least one rolled head iris matches an enrolled iris and at least one of the rolled horizontal axis is within the rotational variance of the enrolled horizontal axis or the rolled horizontal axis is within the rotational variance of the non-rolled horizontal axis.

14. The method of claim 11, further comprising:
accepting, by the iris recognition device, the subject for access processing when both rolled head irises match enrolled irises and at least one of the rolled horizontal axis is within the rotational variance of a respective enrolled horizontal axis or the rolled horizontal axis is within the rotational variance of a respective non-rolled horizontal axis.

15. The method of claim 1, further comprising:
rejecting, by the iris recognition device, access for the subject when at least one of each rolled horizontal axis is greater than the rotational variance of a respective enrolled horizontal axis or each rolled horizontal axis is greater than the rotational variance of a respective non-rolled horizontal axis.

16. The method of claim 11, further comprising:
rejecting, by the iris recognition device, access for the subject when the at least one iris in the non-rolled head iris image fails to match the enrolled iris.

17. The method of claim 11, further comprising:
rejecting, by the iris recognition device, access for the subject when the non-rolled head horizontal axis is greater than the rotational variance of the enrolled horizontal axis.

18. An iris recognition device comprising:
an image capture device configured to capture iris images of a rolled head of a subject needing access via the iris recognition device, wherein acquisition of the iris images of the rolled head occur after a period of time has elapsed to permit weighted spoof contact lenses to reorient on the subject's eyes;

an iris recognition module configured to:
establish a horizontal axis by connecting pupils in an iris image;
match at least one iris in the iris image to an enrolled iris;
determine whether the horizontal axis is within a rotational variance of an enrolled horizontal axis associated with the enrolled iris; and
reject access for the subject when the horizontal axis is greater than the rotational variance of an enrolled horizontal axis.

19. The iris recognition device of claim 18, wherein the period of time is at least 10 seconds.

20. The iris recognition device of claim 18, the iris recognition module further configured to accept the subject for access when at least one iris matches the enrolled iris and the horizontal axis is within the rotational variance of a respective enrolled horizontal axis.

21. A method for weighted spoof contact lens detection, the method comprising:
requesting a subject to roll or tilt head when needing access via an iris recognition device;
waiting, by the iris recognition device, for a period of time after the head is rolled to acquire iris images, wherein the period of time is at least 10 seconds and permits weighted spoof contact lenses to reorient on the subject's eyes;
acquiring, by the iris recognition device, the iris images of a rolled head after the period of time elapses;
establishing, by the iris recognition device, a horizontal axis by connecting pupils in an iris image;
matching, by the iris recognition device, at least one iris in the iris image to an enrolled iris;
determining, by the iris recognition device, whether the horizontal axis is within a rotational variance of an enrolled horizontal axis associated with the enrolled iris or is within a rotational variance of a non-rolled horizontal axis; and
rejecting, by the iris recognition device, access for the subject when the horizontal axis is at least one of greater than the rotational variance of the enrolled horizontal axis or greater than the rotational variance of the non-rolled horizontal axis.

* * * * *